(12) United States Patent
Bauer (10) Patent No.: US 7,856,998 B2
(45) Date of Patent: Dec. 28, 2010

(54) PORTABLE FLUID CONTAINMENT ASSEMBLY

(75) Inventor: Karl James Bauer, Garner, IA (US)

(73) Assignee: Oshkosh Corporation, Oshkosh, WI (US)

( * ) Notice: Subject to any disclaimer, the term of this patent is extended or adjusted under 35 U.S.C. 154(b) by 106 days.

(21) Appl. No.: 12/304,231

(22) PCT Filed: Jun. 11, 2007

(86) PCT No.: PCT/US2007/070863

§ 371 (c)(1),
(2), (4) Date: Dec. 10, 2008

(87) PCT Pub. No.: WO2007/146871

PCT Pub. Date: Dec. 21, 2007

(65) Prior Publication Data

US 2009/0200333 A1  Aug. 13, 2009

Related U.S. Application Data

(60) Provisional application No. 60/813,293, filed on Jun. 13, 2006.

(51) Int. Cl.
B65D 19/00 (2006.01)
B65H 75/34 (2006.01)
(52) U.S. Cl. ............... 137/15.16; 137/267; 137/355.12; 137/355.16
(58) Field of Classification Search ............. 137/267, 137/355.17, 355.12, 899, 351, 355.16, 15.16; 108/55.1; 220/1.5
See application file for complete search history.

(56) References Cited

U.S. PATENT DOCUMENTS

| 790,839 | A | | 5/1905 | Hopkins |
| 881,872 | A | | 3/1908 | Sanford |
| 1,028,612 | A | | 6/1912 | Schneider et al. |
| 1,909,733 | A | | 5/1933 | Thwaits |
| 2,037,774 | A | | 4/1936 | Fox |
| 2,102,686 | A | | 12/1937 | Dunham |
| 2,284,419 | A | | 5/1942 | Greig |
| 2,603,308 | A | * | 7/1952 | McCall ................. 96/138 |

(Continued)

FOREIGN PATENT DOCUMENTS

CA 2122645 4/1995

(Continued)

OTHER PUBLICATIONS

Communication from the European Patent Office mailed on May 9, 2009 and Supplementary European Search Report relating to Application No. EP 07 78 4389, date of completion of the search May 11, 2009 (5 pgs.).

(Continued)

Primary Examiner—Kevin L Lee
(74) Attorney, Agent, or Firm—Foley & Lardner LLP (57) ABSTRACT

A portable fluid containment assembly capable of holding and transporting oils, water, engine antifreeze, and the like and/or used fluids of the same types. The assembly includes multiple fluid tanks that are mounted in a tubular structure integrated into a platform. The tubular structure includes multiple support members and reinforcement bars. The tubular structure includes lift tip members and forklift pockets to facilitate movement of the portable fluid containment assembly.

19 Claims, 6 Drawing Sheets

U.S. PATENT DOCUMENTS

| | | | |
|---|---|---|---|
| 2,625,404 | A | 1/1953 | Treiber |
| 2,632,577 | A | 3/1953 | Sacco |
| 2,953,287 | A | 9/1960 | Werner |
| 3,406,999 | A | 10/1968 | Kozicki |
| 3,534,892 | A | 10/1970 | Truelove, Sr. |
| 3,565,404 | A | 2/1971 | Reid et al. |
| 3,722,533 | A | 3/1973 | Connolly |
| 3,811,792 | A * | 5/1974 | Kennedy, Jr. .................. 417/28 |
| 3,878,896 | A | 4/1975 | White |
| 4,037,664 | A | 7/1977 | Gibson |
| 4,059,170 | A | 11/1977 | Young |
| 4,084,522 | A | 4/1978 | Younger |
| 4,185,924 | A | 1/1980 | Graham |
| 4,266,821 | A | 5/1981 | Gillet |
| 4,295,431 | A | 10/1981 | Stavio |
| 4,319,662 | A | 3/1982 | Liston |
| 4,366,933 | A | 1/1983 | Broussard |
| 4,373,600 | A | 2/1983 | Buschborn et al. |
| 4,374,478 | A | 2/1983 | Secord et al. |
| 4,429,931 | A | 2/1984 | Brooks |
| 4,542,774 | A | 9/1985 | Stavio |
| 4,579,242 | A | 4/1986 | Ellis, III |
| 4,811,804 | A | 3/1989 | Ewers et al. |
| 4,824,158 | A | 4/1989 | Peters et al. |
| 4,830,421 | A | 5/1989 | Hawelka et al. |
| 4,844,490 | A | 7/1989 | Kohler |
| 4,886,282 | A | 12/1989 | Wilkinson et al. |
| 4,909,558 | A | 3/1990 | Roshinsky |
| 5,211,351 | A | 5/1993 | DeClerck |
| 5,346,334 | A | 9/1994 | Einaru et al. |
| 5,346,355 | A | 9/1994 | Riemer |
| 5,349,980 | A * | 9/1994 | Spiegel .......................... 137/1 |
| 5,368,317 | A | 11/1994 | McCombs et al. |
| 5,467,827 | A | 11/1995 | McLoughlin |
| 5,518,023 | A * | 5/1996 | Garcia .................. 137/355.26 |
| 5,553,673 | A | 9/1996 | Hackman |
| 5,560,525 | A | 10/1996 | Grohmann et al. |
| 5,564,767 | A | 10/1996 | Strepek |
| 5,575,521 | A | 11/1996 | Speis |
| 5,617,696 | A | 4/1997 | Young |
| 5,636,648 | A | 6/1997 | O'Brien et al. |
| 5,722,453 | A | 3/1998 | Huxhold |
| 5,749,616 | A | 5/1998 | Steever |
| 5,755,470 | A | 5/1998 | Schempp |
| 5,785,372 | A | 7/1998 | Glatzmeier et al. |
| 5,791,696 | A | 8/1998 | Miyajima et al. |
| 5,871,240 | A | 2/1999 | Miyajima et al. |
| 5,897,154 | A | 4/1999 | Albertini et al. |
| 5,909,780 | A | 6/1999 | De Andrade |
| 5,964,492 | A | 10/1999 | Lyon |
| 5,988,559 | A | 11/1999 | Gnass |
| 6,006,841 | A | 12/1999 | Hunke |
| 6,015,177 | A | 1/2000 | Tijerina |
| 6,035,940 | A | 3/2000 | Bourke |
| 6,158,670 | A | 12/2000 | Blocker |
| 6,217,755 | B1 | 4/2001 | Stifelman et al. |
| 6,289,995 | B1 | 9/2001 | Fuller |
| 6,332,586 | B1 | 12/2001 | Risa et al. |
| 6,394,534 | B1 | 5/2002 | Dean |
| 6,695,328 | B2 | 2/2004 | Cope |
| 6,769,733 | B2 | 8/2004 | Seksaria et al. |
| 6,918,721 | B2 * | 7/2005 | Venton-Walters et al. ... 410/102 |
| 6,997,506 | B2 | 2/2006 | Hecker |

FOREIGN PATENT DOCUMENTS

| | | |
|---|---|---|
| CA | 2144717 | 9/1996 |
| CA | 2146470 | 10/1996 |
| CA | 2316846 | 7/1999 |
| CH | 657 884 A5 | 9/1986 |
| DE | 34 28 664 A1 | 2/1986 |
| DE | 40 16 208 A1 | 11/1991 |
| DE | 42 21 870 A1 | 1/1994 |
| DE | 196 12 278 A1 | 11/1996 |
| DE | 197 04 172 A1 | 8/1998 |
| DE | 198 35 587 A1 | 2/2000 |
| DE | 199 22 023 A1 | 11/2000 |
| DE | 101 24518 A1 | 11/2002 |
| EP | 0 829 274 A1 | 3/1998 |
| EP | 1 048 326 A2 | 11/2000 |
| FR | 2 691 366 A1 | 11/1993 |
| FR | 2 768 419 A1 | 3/1999 |
| FR | 2 781 383 A1 | 1/2000 |
| GB | 150642 | 9/1920 |
| GB | 265004 | 2/1927 |
| GB | 344704 | 3/1931 |
| GB | 346270 | 4/1931 |
| GB | 361802 | 11/1931 |
| GB | 362607 | 12/1931 |
| GB | 371130 | 4/1932 |
| GB | 375546 | 6/1932 |
| GB | 384787 | 12/1932 |
| GB | 475781 | 11/1937 |
| GB | 528149 | 10/1940 |
| GB | 533421 | 2/1941 |
| GB | 546813 | 7/1942 |
| GB | 550506 | 1/1943 |
| GB | 554711 | 7/1943 |
| GB | 554907 | 7/1943 |
| GB | 561699 | 5/1944 |
| GB | 756878 | 9/1956 |
| GB | 761670 | 11/1956 |
| GB | 873628 | 7/1961 |
| GB | 887291 | 1/1962 |
| GB | 943416 | 12/1963 |
| GB | 2 326 082 A | 12/1998 |
| GR | 870102020 | 7/1988 |
| JP | 7-163673 | 6/1995 |
| JP | 9-135918 | 5/1997 |
| JP | 9-173493 | 7/1997 |
| JP | 9-220294 | 8/1997 |
| JP | 9-271529 | 10/1997 |
| JP | 9-308702 | 12/1997 |
| JP | 10-137356 | 5/1998 |
| JP | 10-263103 | 10/1998 |
| JP | 10-314330 | 12/1998 |
| JP | 11-9716 | 1/1999 |
| JP | 11-47303 | 2/1999 |
| JP | 11-47304 | 2/1999 |
| JP | 11-128385 | 5/1999 |
| JP | 11-155972 | 6/1999 |
| JP | 2000-37471 | 2/2000 |
| JP | 2000-296183 | 10/2000 |
| JP | 2001-9054 | 1/2001 |
| JP | 2002-173271 | 6/2002 |
| JP | 2002-186681 | 7/2002 |
| JP | 2003-93535 | 4/2003 |
| RU | 2 106 164 C1 | 3/1998 |
| RU | 2175567 C2 | 11/2001 |
| WO | WO 98/09681 | 3/1998 |
| WO | WO 98/57709 | 12/1998 |
| WO | WO 99/33739 | 7/1999 |

OTHER PUBLICATIONS

PCT International Search Report, concerning International Application No. PCT/US07/70863, date of mailing of the International Search Report Jul. 23, 2008 (3 pgs.).

PCT Written Opinion of the International Searching Authority, concerning International Application No. PCT/US07/70863, date of mailing of the Opinion Jul. 23, 2008 (5 pgs.).

* cited by examiner

PORTABLE FLUID CONTAINMENT ASSEMBLY

CROSS-REFERENCE TO RELATED PATENT APPLICATIONS

This application claims priority from U.S. Provisional Application No. 60/813,293, filed Jun. 13, 2006, incorporated herein by reference in its entirety.

FIELD

This disclosure is directed to fluid containment systems and assemblies. More particularly, it is directed to a portable fluid containment assembly configured for transporting oils, water, engine antifreeze, grease and the like and/or used fluids of the same types. The disclosure also relates to portable mounting systems for fluid vessels, reservoirs, tanks, and the like, to hold and transport fluids. The disclosure relates also to portable stand alone fluid containment assemblies for shop use in construction, mining, equipment service fields, and the like.

BACKGROUND

Fluid containment devices, such as reservoirs, tanks, and the like typically are constructed as tanks of large capacity, and are typically made of metal, such as steel. These tanks have high strength requirements due to the weight of the fluid stored and/or transported in them and typically include multiple elements that are welded together to form the tank. Due to their weight, the tanks and their mounting systems are difficult to be moved and accessed for any required maintenance. Additionally, metal tanks are known to be subject to corrosion during use, and their welded joints provide stress points, which may produce fluid leaks in the tank. Such tanks are also subject to condensation and contamination of fluids contained inside the tank due to accumulation of rust and water. In addition, metal tanks intended to be mounted on service utility vehicles experience serious weight constraints for a given gross vehicle weight.

Thus, there exists a need for a fluid containment design that overcomes the above limitations. There is also a need for a portable fluid containment assembly intended to be mounted on service utility type trucks. A need also exists for a portable fluid containment assembly that provides easy access for any required maintenance. There is also a need for a portable fluid containment assembly that meets weight constraints for mounting on service utility type trucks. There is also a need for a stand alone fluid containment assembly intended for shop use in construction, mining, equipment service fields, and the like that provides easy access for any required maintenance. There is also a need for a fluid containment design that eliminates condensation inside the fluid vessel, as well as reduces contamination of the fluids due to rust and water, and eliminates stress points, which may produce fluid leaks. There is also a need for a fluid containment assembly that includes means for securing fluid vessels to provide expedited transposition of the fluid containment assembly. In addition, there is a need for a fluid containment assembly capable of providing a variety of servicing fluids.

SUMMARY

There is provided a portable fluid containment assembly including a plurality of fluid vessels and a generally horizontal platform configured to receive the plurality of fluid vessels. The fluid vessels are placed substantially contiguous to each other to form a fluid vessel pack. The assembly also includes a framework integrated into the platform. The framework at least partially envelopes the fluid vessel pack to secure the fluid vessel pack along a surface of the platform to provide facile transportation of the fluid containment assembly.

There is further provided a method to convey a plurality of different types of fluid, with each type of fluid disposed in a fluid container, to and from a work site. The method comprises providing a framework configured to receive each of the fluid containers. Aligning the fluid containers adjacent to each other within the framework. Securing the fluid containers within the framework; and disposing the framework on a vehicle, wherein the framework and fluid containers move to and from the work site by the vehicle There is further provided a vehicle including a support structure, a support member coupled to the support structure and a portable fluid containment assembly. The portable fluid containment assembly includes a plurality of fluid vessels, a generally horizontal platform configured to receive the plurality of fluid vessels, the plurality of fluid vessels being aligned substantially contiguous to each other to form a fluid vessel pack A framework is integrated into the platform and enveloping at least partially the fluid vessel pack, wherein the fluid vessel pack is secured along a surface of the platform to provide facile transposition of the fluid containment assembly.

BRIEF DESCRIPTION OF THE DRAWINGS

The accompanying drawings incorporated in and forming a part of the specification, illustrate several aspects of an exemplary embodiment of a portable fluid containment assembly.

DETAILED DESCRIPTION

This disclosure is directed to a fluid containment assembly, also referred to as a "lubskid". In particular, this invention is directed to a portable fluid containment assembly designed to be capable of holding and transporting oils, water, engine antifreeze, grease and the like and/or used fluids of the same types. It will be appreciated by those skilled in the art that the portable fluid containment assembly, is suitably adapted for shop use in construction, mining, equipment service fields, and the like, as well as for being mounted onto mobile type equipment.

Further, there is provided a portable fluid containment assembly intended for mounting on service utility type trucks.

Still further, there is provided a portable fluid containment assembly to be used as a stand alone fluid containment assembly intended for shop use in construction, mining, equipment service fields, and the like that provides easy access for any required maintenance.

Yet further, there is provided a fluid containment assembly that eliminates stress points, such as weld joints that may produce fluid leaks.

Still further, there is provided a fluid containment assembly that reduces or substantially eliminates contamination of the fluids inside the containment due to rust and water.

Figure 1:
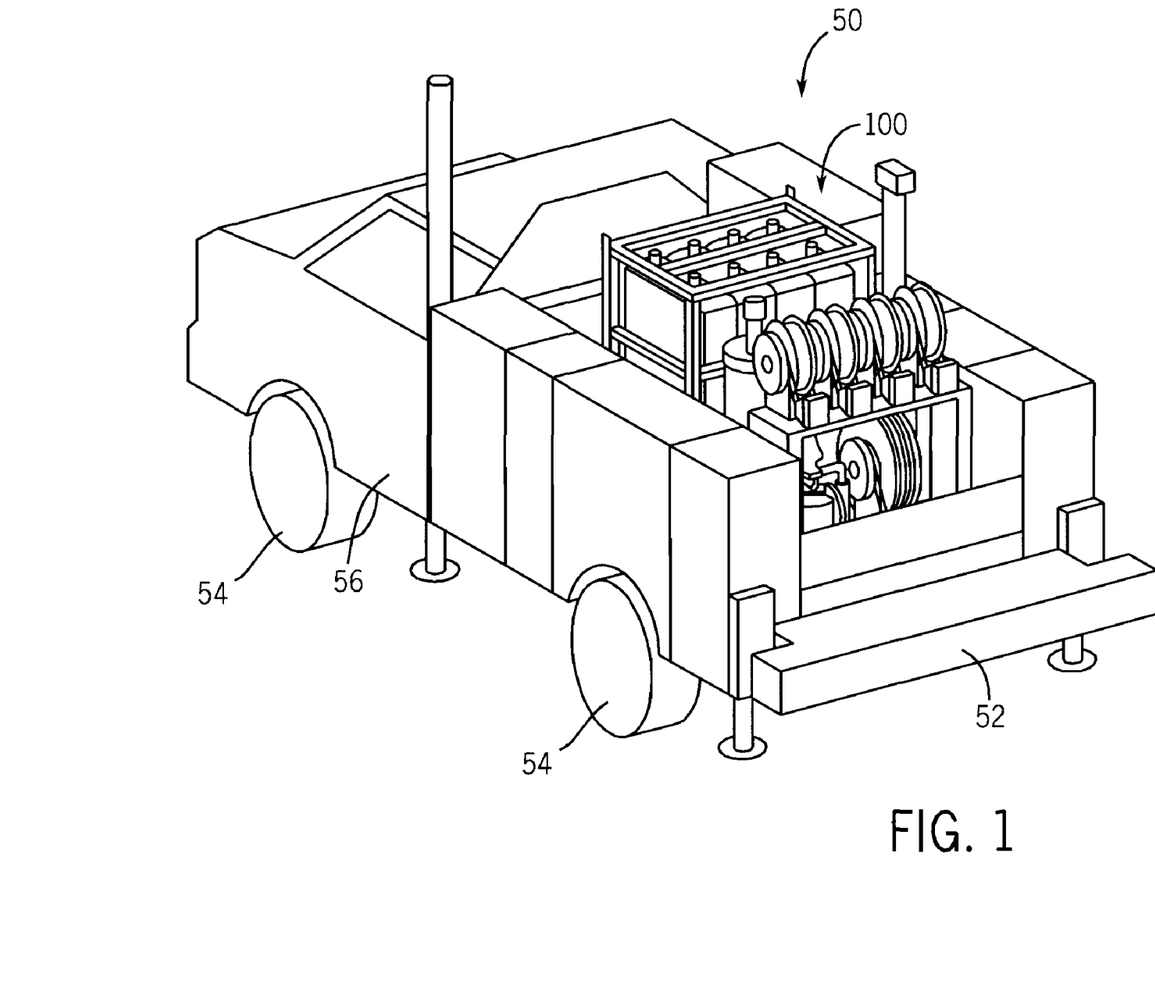
FIG. 1 illustrates an over-all perspective view of the vehicle with a portable fluid containment assembly according to an exemplary embodiment.
Figure 2:
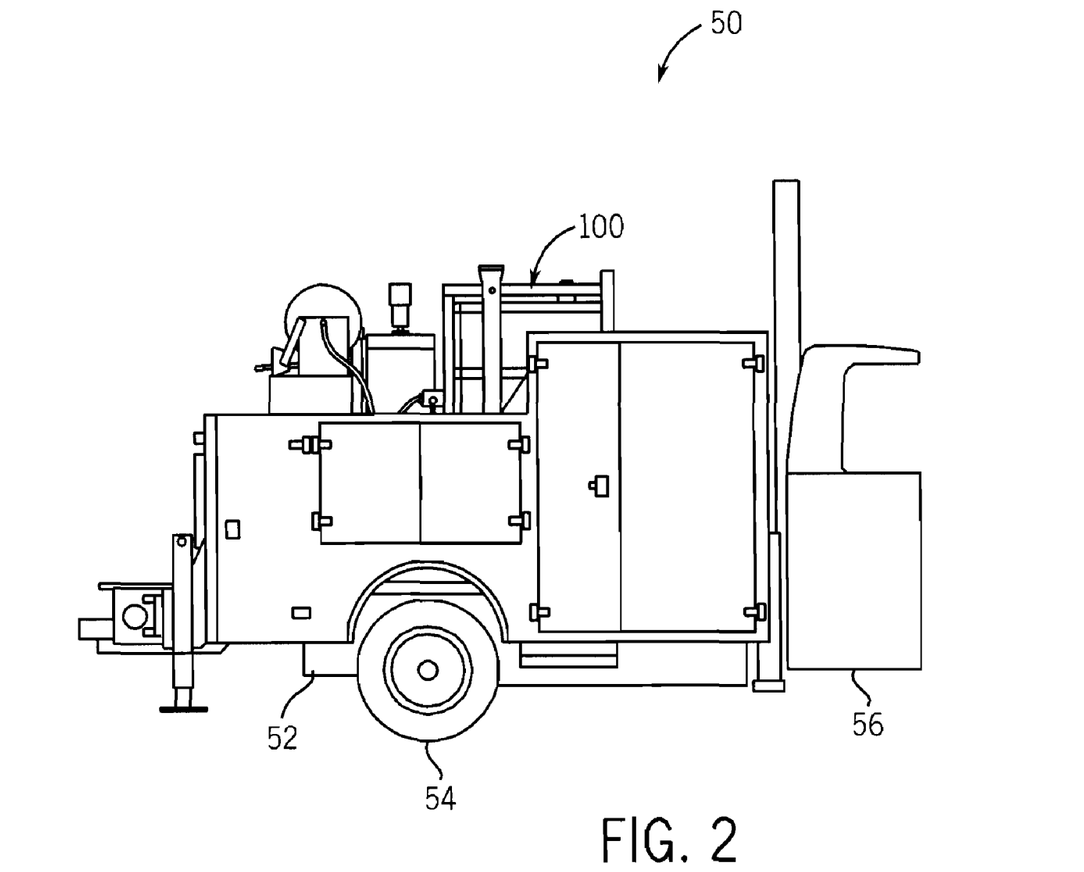
FIG. 2 illustrates a side view of the vehicle of FIG. 1.
Figure 3:
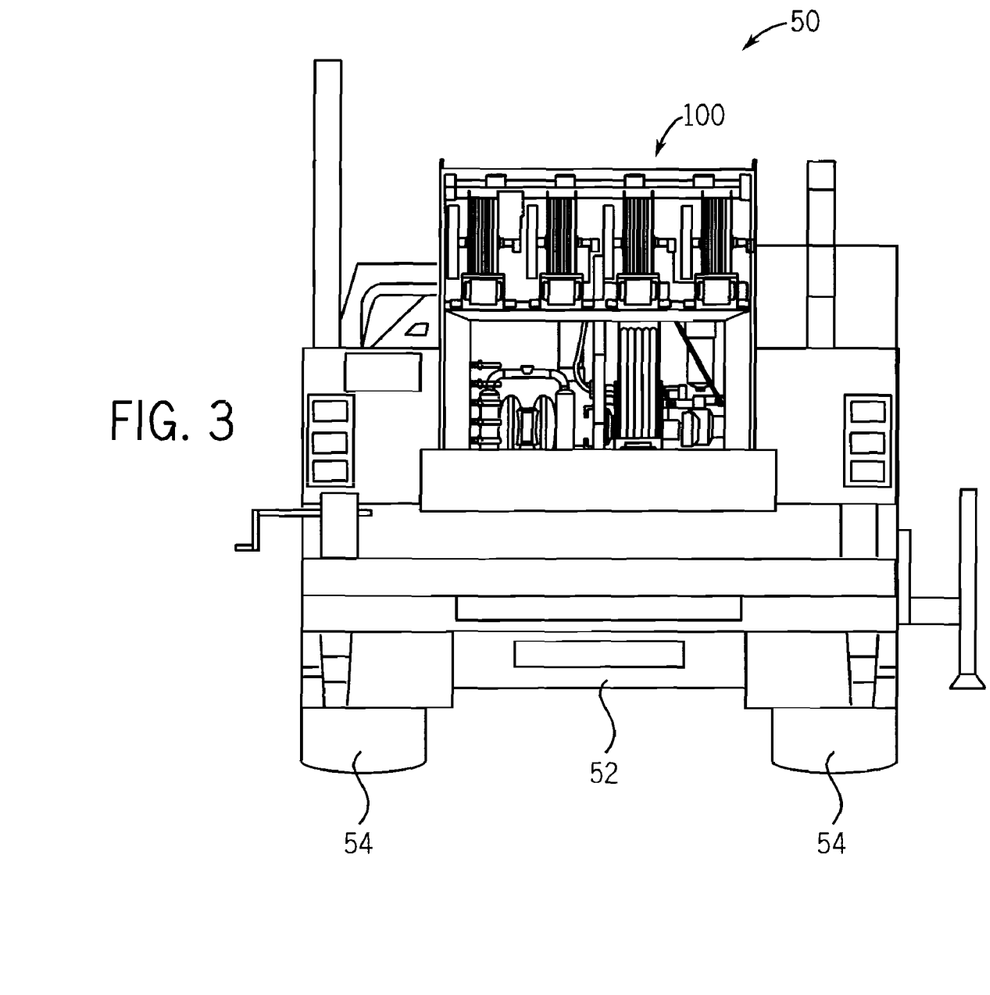
FIG. 3 illustrates a rear elevation view of the vehicle of FIG. 1.
Figure 4:
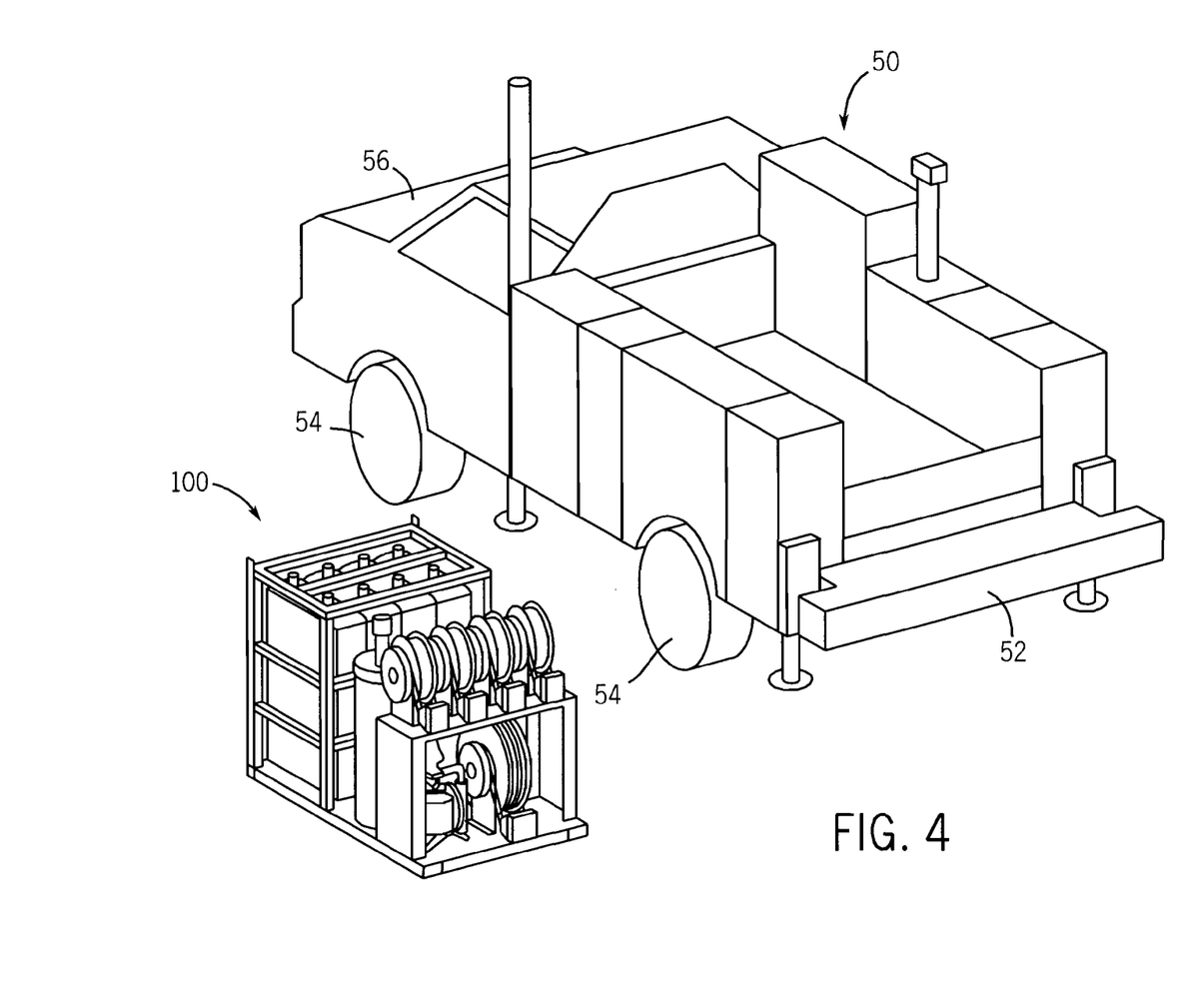
FIG. 4 illustrates an over-all perspective view of the vehicle of FIG. 1 configured to receive the portable fluid containment assembly.

Referring to FIGS. 1-3, there is shown a vehicle 50 that is configured to transport a portable fluid containment assembly 100. The vehicle 50 is a truck that includes a support structure 52 (e.g., frame, bed, platform, chassis, etc.), one or more support members 54, and a cab 56. According to various exemplary embodiments, the support members 54 may be wheels, tracks, or any other members that are in communication with both the ground and the support structure 52. The support structure 52 provides a structure to support the fluid containment assembly 100 and the cab 56. The cab 56 provides a compartment for one or more occupants where one of the occupants is a driver. According to other exemplary embodiments, vehicle 50 may not be self-propelled and may be a platform, trailer or other structure that is towed or otherwise propelled by a truck. As shown in FIG. 4, the portable fluid assembly 100 is configured to be removable from the vehicle 50. The portable fluid assembly 100 may be removed at a filling are to be filled or otherwise serviced, or may be removed at a destination site such as a construction site, a mining site, and an equipment service site etc.

Figure 5:
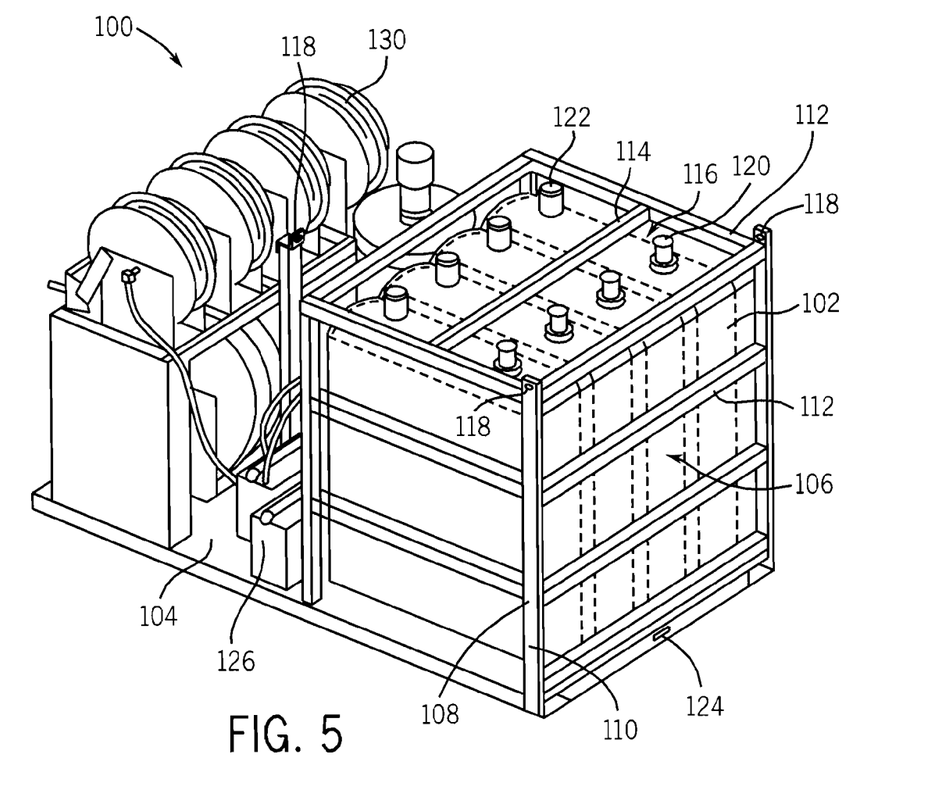
FIG. 5 illustrates an over-all perspective view of the portable fluid containment assembly of FIG. 4.

Turning now to FIG. 5, there is shown an isometric view of an exemplary embodiment of the portable fluid containment assembly 100. The portable fluid containment assembly 100 includes a plurality of rectilinear fluid vessels 102 and a generally horizontal platform 104 configured to receive the plurality of rectilinear fluid vessels 102. In a preferred embodiment depicted in FIG. 5, the portable fluid containment assembly 100 includes four rectilinear fluid vessels 102. As will be appreciated by those skilled in the art, four rectilinear fluid vessels 102 are included in the portable fluid containment assembly 100 not as a limitation, but for illustration purposes only. The number of fluid vessels 102 included in the portable fluid containment assembly 100 is defined, for example and without limitation, by the weight constraints for fluid vessels to be mounted on service utility vehicles, such that the overall weight constraints are to be fully met. A skilled artisan will appreciate that the number of fluid vessels 102 included in the portable fluid containment assembly 100 also suitably meets consumer needs.

The rectilinear fluid vessels 102 are placed substantially contiguous to each other to form a fluid vessel pack 106. The assembly 100 also includes a framework 108 that is suitably secured to the platform 104. In the embodiment of FIG. 5, the framework 108 at least partially surrounds and supports the fluid vessel pack 106 and secures the fluid vessel pack 106 along a surface of the platform 104 to facilitate the transposition of the fluid containment assembly 100. The framework 108 includes multiple support members 110 secured generally perpendicularly to the platform 104 and multiple reinforcement bars 112 engaged generally perpendicular with corresponding support members 110. In the embodiment illustrated in FIG. 5, three support members 110 are suitably supplied each with a respective tip member 118 adopted for lifting the portable fluid containment assembly 100 by means of suitable lifting facilities (not shown in the drawings). As will be recognized by a skilled artisan, three tip members 118 are included in the portable fluid containment assembly 100 not as a limitation, but for illustration purposes only.

In the embodiment illustrated in FIG. 5, the portable fluid framework 108 of the containment assembly 100 includes an additional reinforcement bar 114 placed along a top surface 116 of the fluid vessel pack 106. The additional reinforcement bar 114 is engaged generally perpendicular to corresponding reinforcement bars 112. As it will be appreciated by those skilled in the art, one additional reinforcement bar 114 is included in the portable fluid containment assembly 100 not as a limitation, but for illustration purposes only. Depending on the number, size and/or weight of rectilinear fluid vessels 102 included in the fluid vessel pack 106, the portable fluid containment assembly 100 suitably includes two or more additional reinforcement bars 114. The framework 108 is secured to the platform 104 by any means known in the art. For example, and without limitation, the support members 110 of the framework 108 are integrated into the platform 104, for example, by molding, or are affixed using corresponding fasteners or by welding or adhesives, or a combination of such processes. Also, those skilled in the art will appreciate that multiple reinforcement bars 112 are engaged with corresponding multiple support members 110 by suitable affixing means known in the art.

In a preferred embodiment, the fluid vessels 102 are suitably shaped as substantially rectangular prismatic bodies and are formed of a plastic, such as polyethylene, or the like. The skilled artisan will appreciate that the plastic used for the fluid vessels 102 is preferably translucent, ultraviolet stable, impact resistant and compatible with the type of fluid to be stored in each respective fluid vessel.

The fluid vessels 102 each include a lockable fill cap 120 and a breather filter 122. The breather filter 122 media is preferably, but without limitation, of one micron. The fluid vessel 102 is also supplied with a fitting installed near the bottom for attaching a suction line to remote mounted pneumatic powered fluid transfer pumps 126. The platform 104 also includes tie-down rings 124 configured to secure the portable fluid containment assembly 100. While the embodiment illustrated in FIG. 5 illustrates one tie-down ring 124, it should be understood that the fluid containment assembly 100 may include more tie-down rings 124.

Figure 6:
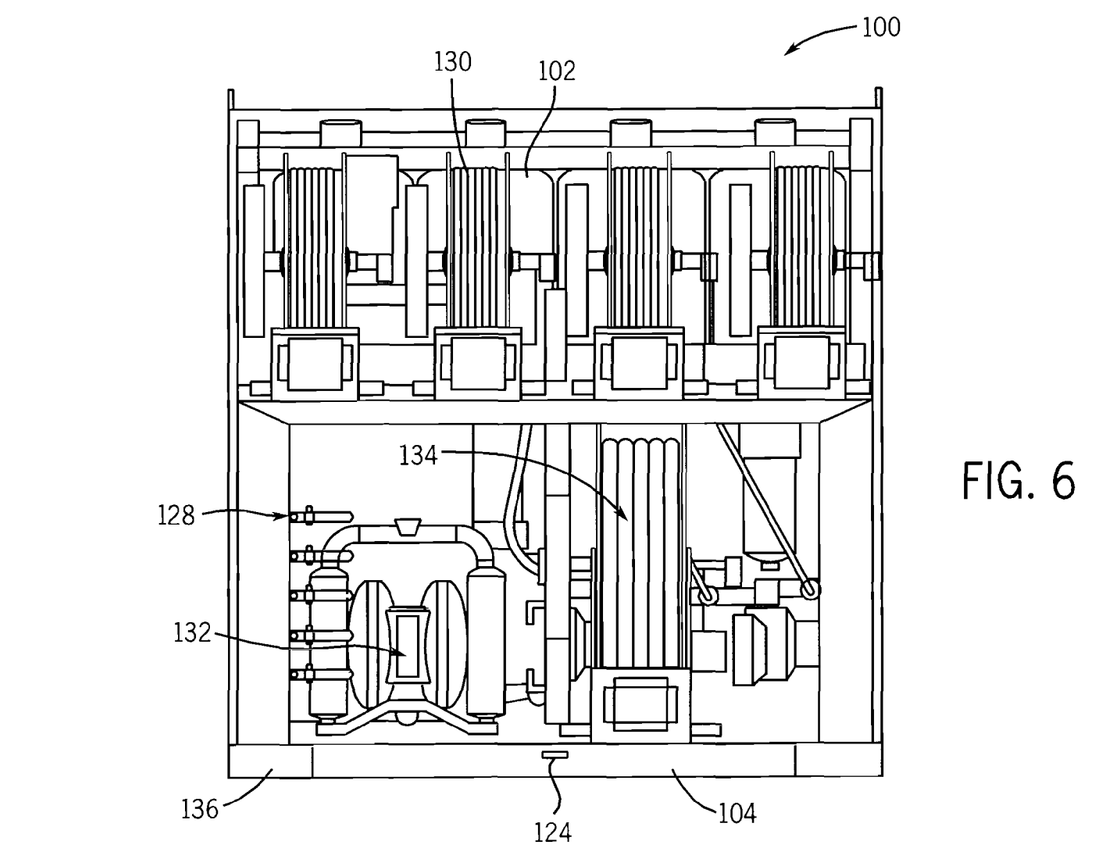
FIG. 6 illustrates a rear view of the portable fluid containment assembly of FIG. 4.

Turning now to FIG. 6, a rear view of the portable fluid containment assembly 100 of FIG. 5, is illustrated. As illustrated in FIG. 6, the fluid containment assembly 100 of the invention includes control valves 202 and suitable fluid reels 130. The portable fluid containment assembly 100 may also include a salvage pump 132 and a suitable hose reel 134. The number of control valves 128, and the number of fluid reels 130 corresponds to the number of fluid vessels 102. Also shown in FIG. 6 are two cavities 136 defined in the platform 104. The two cavities 136 are included in the portable fluid containment assembly 100 not as a limitation, but for illustration purposes only. The actual number of cavities 136 suitably depends on the overall weight of the fluid containment assembly 100 and on the specifications of the lifting facilities. It should be understood that a material moving device or apparatus other than a forklift can utilize the cavities.

In a preferred embodiment, the fluid vessels are available in 55 U.S. gallons, which for the embodiment illustrated in FIG. 5 and FIG. 6 allow for a 220 total U.S. gallon capacity fluid containment assembly 100. The skilled artisan will appreciate that the fluid capacities referred to herein are for illustration purposes only is not limited to above cited fluid capacities. A skilled artisan will also appreciate that the use of polyethylene materials allows for an average weight savings of 82.5% compared to the same size reservoir (tank) made of steel. This in turn allows for up to 29% more fluid carrying capability compared to steel for a given gross vehicle weight. Appropriate baffles may be provided in one or more of the fluid vessels 102 to minimize and control fluid movement during transport.

The fluid vessel mounting configuration allows the fuel vessels to be contained under the most severe operating conditions, while making them simple to remove and access for any required maintenance. The fluid containment assembly design allows for portability since it can fit in any type of standard service utility truck body. It will be recognized by those skilled in the art that the fluid containment assembly of the subject application can be suitably used as a stand alone device utilizing either shop air, or an onboard air system on a truck. In addition, the fluid containment assembly is capable of including fluid vessels with a variety of different servicing fluids. It will also be recognized by those skilled in the art that the embodiments described above are equally suited to be used for filling or evacuating respective reservoirs utilizing a suitable skid arrangement known in the art.

In a preferred embodiment, the framework includes multiple support members secured generally perpendicularly to the platform and multiple reinforcement bars engaged generally perpendicular to corresponding support members. The framework, preferably, further includes at least one additional reinforcement bar placed along a top surface of the fluid vessel pack. The at least one additional reinforcement bar is engaged generally perpendicular to corresponding reinforcement bars.

In another preferred embodiment, at least two of the support members are supplied each with a respective tip member adopted for lifting the portable fluid containment assembly by means of lifting facilities. Preferably, the platform further includes at least two forklift pockets.

In yet another preferred embodiment, the fluid vessels of the plurality each include a body shaped as a substantially rectangular cylinder.

In an alternative embodiment, the body of at least one fluid vessel is comprised of non-metallic material. The non-metallic material is, suitably, at last one of translucent, ultraviolet stable, and impact resistant. In a preferred embodiment the non-metallic material is polyethylene plastics.

Still further, the fluid vessels each include a lockable fill cap. Preferably, the fluid vessels further each include a breather filter. In addition, the fluid vessels further each include a suction line port engaged with the fluid vessel and adapted to receive a suction line from a remote fluid transfer pump.

In an alternative embodiment, the platform further includes at least two tie-down rings adapted for secure mounting of the portable fluid containment assembly.

Still further, the portable fluid containment assembly includes a plurality of reels coupled with corresponding fluid vessels. Preferably, the portable fluid containment assembly of the invention includes a plurality of control valves coupled with corresponding fluid vessels. In addition, the portable fluid containment assembly suitably includes a salvage pump coupled with a corresponding reel.

An advantage of the portable fluid containment assembly is the provision of a fluid containment assembly that does not allow foreign materials and contaminants into the fluid vessel.

Another advantage is the provision of a fluid containment assembly that meets weight constraints for fluid containments intended to be mounted on service utility vehicles.

Another advantage is the provision of a portable stand alone fluid containment assembly utilizing either shop air, or an onboard air system on a truck.

Another advantage of the present invention is the provision of a portable fluid containment assembly that is equally suited to be used for filling or evacuating respective reservoirs.

Yet another advantage is the provision of a fluid containment assembly including a mounting design that allows it to be contained under the most severe operating conditions, and provides trouble-free removing and accessing for any required maintenance.

For purposes of this disclosure, the term "coupled" means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components or the two components and any additional member being attached to one another. Such joining may be permanent in nature or alternatively may be removable or releasable in nature The construction and arrangement of the elements of the portable fluid containment assembly as shown in the illustrated and other exemplary embodiments is illustrative only. Although only a few embodiments of the present portable fluid containment assembly have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited herein (e.g. materials for formation of the framework, technology for communicating image signals to a display panel concerning the status of fluid in the fluid vessels, etc.). By further way of example, elements shown as integrally formed may be constructed of multiple parts or elements, the position of elements may be reversed or otherwise varied, and the nature or number of discrete elements or positions may be altered or varied. It should be noted that the elements and/or assemblies of the roof system may be constructed from any of a wide variety of materials that provide sufficient strength or durability, including any of a wide variety of materials in any of a wide variety of colors, combinations and suitable materials. Other substitutions, modifications, changes and omissions may be made in the design, operating conditions and arrangement of the preferred and other exemplary embodiments.

The order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration and arrangement of the preferred and other exemplary embodiments.

What is claimed is:

1. A portable fluid containment assembly for use with a vehicle, comprising:
   a plurality of fluid vessels;
   a generally horizontal platform configured to receive the plurality of fluid vessels, the plurality of fluid vessels being aligned substantially contiguous to each other to form a fluid vessel pack;
   a reel/hose set associated with each of the fluid vessels;
   a control valve associated with each of the fluid vessels;

a suction line port coupled to each of the fluid vessels and configured to receive a suction line from a fluid transfer pump;

a salvage pump coupled to the platform; and a framework integrated into the platform and at least partially enveloping the fluid vessel pack, wherein the fluid vessel pack is secured along a surface of the platform to provide facile transposition of the fluid containment assembly; and wherein the platform includes at least one tie-down ring configured to removably secure the platform to the vehicle.

2. The portable fluid containment assembly of claim 1 wherein the framework includes multiple support members secured generally perpendicularly to the platform and a plurality of reinforcement bars engaged generally perpendicular with corresponding support members.

3. The portable fluid containment assembly of claim 2 wherein the framework further includes at least one additional reinforcement bar placed along a top surface of the fluid vessel pack and coupled generally perpendicular to the corresponding reinforcement bars.

4. The portable fluid containment assembly of claim 2 wherein at least two of the support members including a tip member configured to engage lifting facilities for moving the portable fluid containment assembly.

5. The portable fluid containment assembly of claim 1 wherein the platform further defines at least two forklift pockets.

6. The portable fluid containment assembly of claim 1 wherein the fluid vessels each include a body configured as a substantially rectangular cylinder.

7. The portable fluid containment assembly of claim 6 wherein the body of at least one fluid vessel is comprised of non-metallic material.

8. The portable fluid containment assembly of claim 7 wherein the non-metallic material is polyethylene plastic.

9. The portable fluid containment assembly of claim 1 wherein the fluid vessels further each include a lockable fill cap.

10. The portable fluid containment assembly of claim 1 wherein the fluid vessels further each include a breather filter.

11. The portable fluid containment assembly of claim 1 further comprising a salvage hose/reel associated with the salvage pump and coupled to the framework.

12. A method to convey and dispense a plurality of different types of fluid, with each type of fluid disposed in a fluid container, to and from a work site, the method comprising:

providing a framework configured to receive each of the fluid containers;

aligning the fluid containers adjacent to each other within the framework;

securing the fluid containers within the framework; and disposing the framework on a vehicle and removably securing the framework to the vehicle at one or more tie down rings, providing a hose/reel and a fluid transfer pump and a control valve coupled to the framework and operably associated with each of the fluid containers to dispense fluid therefrom;

providing a salvage pump coupled to the framework;

wherein the framework and fluid containers move to and from the work site by the vehicle, and fluids may be dispensed from the containers in a first mode with the framework and fluid containers disposed on the vehicle, and the fluids may be dispensed from the containers in a second mode with the framework and fluid containers separate from the vehicle.

13. The method of claim 12, including the step of providing a salvage hose/reel associated with the salvage pump, the salvage hose/reel coupled to the framework.

14. The method of claim 12, wherein the vehicle is one of a truck and a trailer.

15. The method of claim 12, wherein the step of disposing includes using forklift pockets defined in the framework.

16. A vehicle comprising:

a support structure;

a support member coupled to the support structure; and a portable fluid containment assembly removably attachable to the vehicle for delivery to a job site, the assembly comprising:

a plurality of fluid vessels;

a generally horizontal platform configured to receive the plurality of fluid vessels, the plurality of fluid vessels being aligned substantially contiguous to each other to form a fluid vessel pack;

a framework integrated into the platform and enveloping at least partially the fluid vessel pack, wherein the fluid vessel pack is secured along a surface of the platform to provide facile transposition of the fluid containment assembly;

a reel/hose set associated with each of the fluid vessels;

a control valve associated with each of the fluid vessels;

a fluid transfer pump coupled to the platform and associated with each of the reel/hose sets; and a salvage pump and a salvage hose/reel coupled to the framework.

17. The vehicle of claim 16 wherein the framework includes multiple support members secured generally perpendicularly to the platform and a plurality of reinforcement bars engaged generally perpendicular with corresponding support members.

18. The vehicle of claim 17 wherein the framework further includes at least one additional reinforcement bar placed along a top surface of the fluid vessel pack and coupled generally perpendicular to the corresponding reinforcement bars.

19. The vehicle of claim 17 wherein the body of at least one fluid vessel is comprised of non-metallic material.

* * * * *